United States Patent [19]

Hayashi et al.

[11] Patent Number: 4,623,242

[45] Date of Patent: Nov. 18, 1986

[54] VARIABLE SPEED IMAGE-FORMING APPARATUS

[75] Inventors: Kiyoshi Hayashi, Takatsuki; Setsuo Hori; Nobuyuki Hirata, both of Sakai; Kazuhiro Kobayashi; Masayuki Mizuno, both of Osaka, all of Japan

[73] Assignee: Mita Industrial Co., Ltd., Japan

[21] Appl. No.: 773,974

[22] Filed: Sep. 9, 1985

Related U.S. Application Data

[62] Division of Ser. No. 556,213, Nov. 29, 1983, Pat. No. 4,557,586.

[30] Foreign Application Priority Data

Nov. 30, 1982 [JP] Japan .................................. 57-210288
Nov. 30, 1982 [JP] Japan ........................... 57-181696[U]

[51] Int. Cl.[4] ............................................. G03G 15/00
[52] U.S. Cl. .................... 355/14 R; 355/3 R; 355/8; 358/300
[58] Field of Search .................. 355/3 R, 8, 11, 14 R; 346/160; 358/300, 302; 354/5

[56] References Cited

U.S. PATENT DOCUMENTS

3,869,569 3/1975 Mason et al. .................. 346/160 X
4,411,514 10/1983 Komori et al. ..................... 355/8 Y
4,445,125 4/1984 Scifres .............................. 358/302 X

Primary Examiner—Arthur T. Grimley
Assistant Examiner—J. Pendegrass
Attorney, Agent, or Firm—Beveridge, Degrandi & Weilacher

[57] ABSTRACT

An image-forming apparatus equipped with an optical means, an electrostatic image-forming means and a control means. The optical means projects a scanned light beam to be controlled according to an image to be formed. The image-forming means receives the scanned light beam projected from the optical means and forms an image corresponding to the scanned light beam. The control means controls the optical means and the image-forming means.

4 Claims, 18 Drawing Figures

VARIABLE SPEED IMAGE-FORMING APPARATUS

This is a division of application Ser. No. 556,213, filed Nov. 29, 1983, now U.S. Pat. No. 4,557,586.

FIELD OF THE INVENTION

This invention relates to an image-forming apparatus, and more specifically, to an image-forming apparatus comprising an optical means for projecting a scanned light beam to be controlled according to an image to be formed, an electrostatic image-forming means for receiving the scanned light beam projected from the optical means and forming an image corresponding to the scanned light beam, and a control means for controlling the optical means and the image-forming means.

DESCRIPTION OF THE INVENTION

In recent years, image-forming apparatuses of the above-described type have been proposed and gained commercial acceptance as output devices or printing devices in computer systems, word processing systems, etc. The prior image-forming apparatuses, however, have problems or defects to be overcome. Among these are:

(1) In the image-forming means of the aforesaid image-forming apparatus, it is often necessary to get access to its various constituent elements in order, for example, to supply or exchange developers for development of latent electrostatic images, or to clean or exchange an electrostatographic material. It is important on the other hand that the various elements of the optical means should be held fully accurately at required positions and protected from contamination by the developers, dust and dirt, etc. Accordingly, it is important to its various elements from being moved upon inadvertent touching by hand, or to avoid adhesion of developers, dust and dirt, etc. to the various elements owing to careless handling. Since, however, the conventional image-forming apparatus accomodates the optical means, the image-forming means and the control means together in a common housing, it is comparatively difficult to get access to the various constituent elements of the image-forming means without adversly affecting the optical means.

(2) In the optical means of the aforesaid image-forming apparatus, a rotating polygon mirror assembly rotating at high speeds is generally used as means for scanning a light beam. This rotating polygon mirror assembly, however, produces considerable noises which are displeasing to the operator and other persons.

(3) In the optical means of the aforesaid image-forming apparatus, a light beam generating means such as a laser tube is used. Such light beam generating means decreases in function after use for a long period of time, and the light beam output is reduced. In order, therefore, to obtain the desired image, it is necessary to detect the light beam from the light beam generating means and when it is found that the output of the light beam is reduced, exchange the light beam generating means. In the conventional image-forming apparatus, a light beam detector is disposed at the end portion of an exposure area of the image-forming means, i.e. an area to which the scanned light beam is projected from the optical means, which is not utilized for image formation, and the scanned light beam is detected by this light beam detector. Such a detecting method in the conventional image-forming apparatus, however, has some defects. For example, according to this method, the light beam from the light beam generating means is not directly detected. What is detected is the scanned light beam scanned by the scanning means. Hence, a deterioration in the light beam caused by malfunctioning of devices which affect the light beam, such as the scanning means and a modulating means existing between the scanning means and the light beam generating means, is detected as a deterioration in the light beam generating means. Furthermore, the scanned light beam is projected onto the light beam detector repeatedly at time intervals. The duration of projection, however, is only very short, and the judgement of the scanned light beam so detected is relatively difficutl.

(4) In the optical means of the aforesaid image-forming apparatus, it is important that its various constituent elements such as reflecting mirrors and lenses should be maintained clean and protected from contamination. In the conventional image-forming apparatus, however, contamination of the various constituent elements of the optical means cannot be fully prevented, and the developers used in the image-forming means and dust and dirt. adhere often to the various constituent elements of the optical means.

(5) With the aforesaid image-forming apparatus, it is desired both to obtain an image of high quality, and to increase the speed of image formation at the sacrifice of some reduction in image quality. Therefore, the speed of image formation is desired to be changed as required. The conventional image-forming apparatus cannot meet this requirement.

(6) The optical means of the aforesaid image-forming apparatus includes various elements such as light beam generating means, a condensing lens, a modulating means and reflecting mirrors. It is important that these elements should be accurately held at the required positions. In the prior art, the positions of the various elements of the optical means are adjusted by moving them on a trial-and-error basis. Such a method of adjusting positions has the disadvantage that relatively long periods of time are required and a sufficient accuracy in adjustment cannot be obtained.

SUMMARY OF THE INVENTION

Among others, an object of this invention is to provide an image-forming apparatus in which the speed of image formation can be changed as required, and therefore it is possible to select whether to obtain an image of high quality or to obtain an image at a fairly high speed at the sacrifice of some reduction in image quality.

In one aspect of this invention, the image-forming apparatus comprises an image-forming means composed of an image-forming unit having a first housing an optical means composed of an optical unit having a second housing and a control means composed of a control unit having a third housing. Thus in one aspect of this invention, the optical means includes means for changing the diameter of a scanned light beam, and according to the change of the diameter of the scanned light beam, the control means changes the feeding of image signals to the optical means and also changes the moving speed of an electrostatographic material in an image-forming means.

The above and other objects of the invention will become apparent from the following description.

DETAILED DESCRIPTION OF PREFERRED EMBODIMENTS

One specific embodiment of the image-forming apparatus constructed in accordance with this invention will be described below in detail with reference to the accompanying drawings.

General construction

Figure 1:
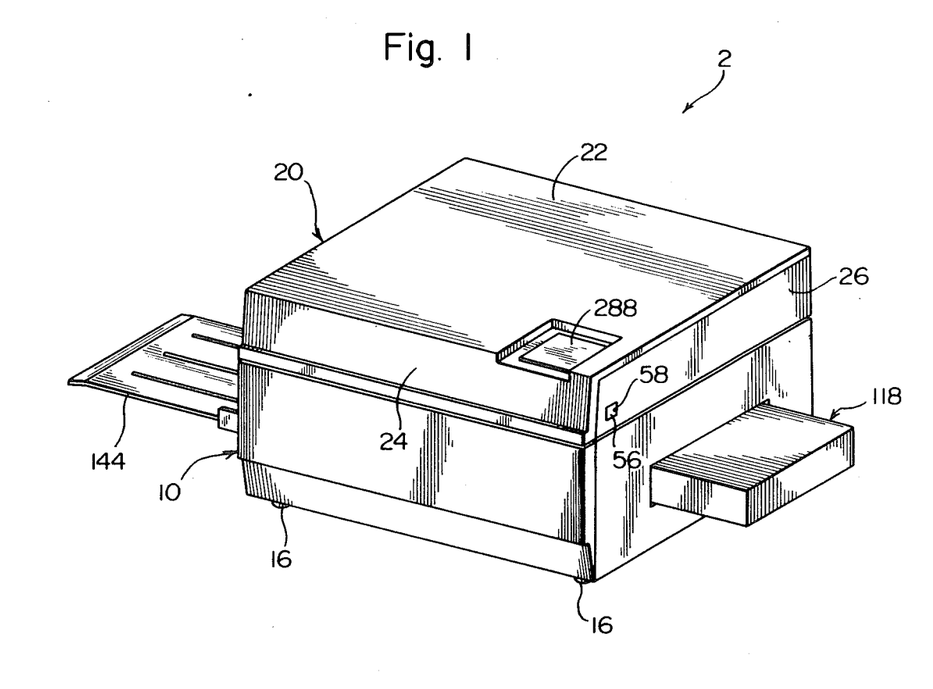
FIG. 1 is a perspective view showing one embodiment of the image-forming apparatus constructed in accordance with this invention.
Figure 2:
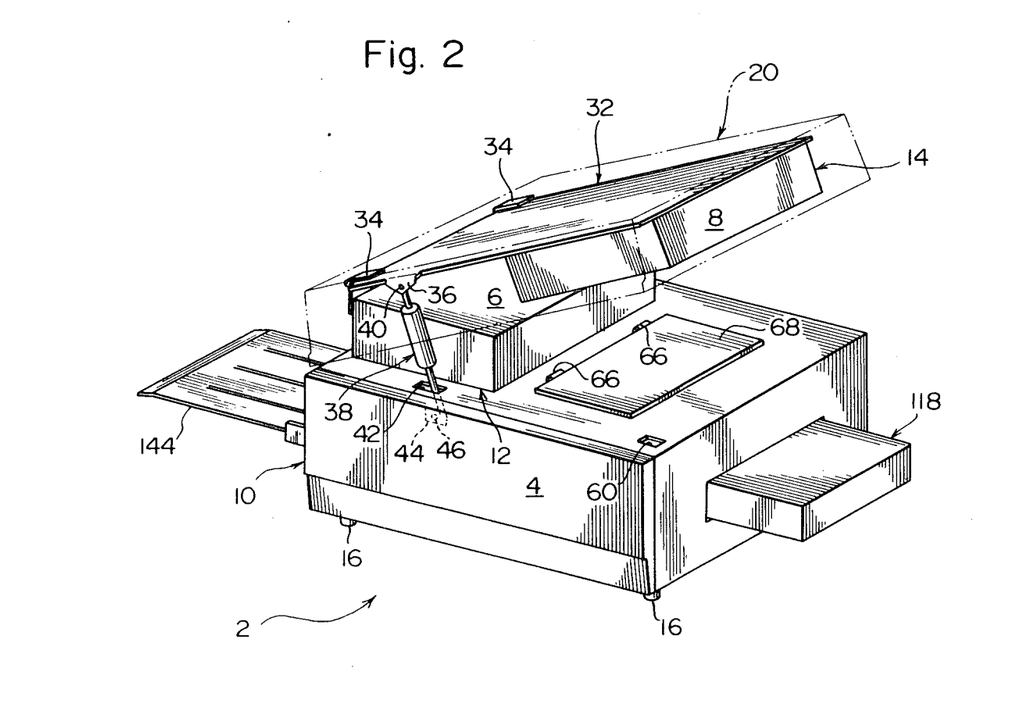
FIG. 2 is a perspective view showing the image-forming apparatus of FIG. 1 in a condition in which the cover is held at an open position.
Figure 3:
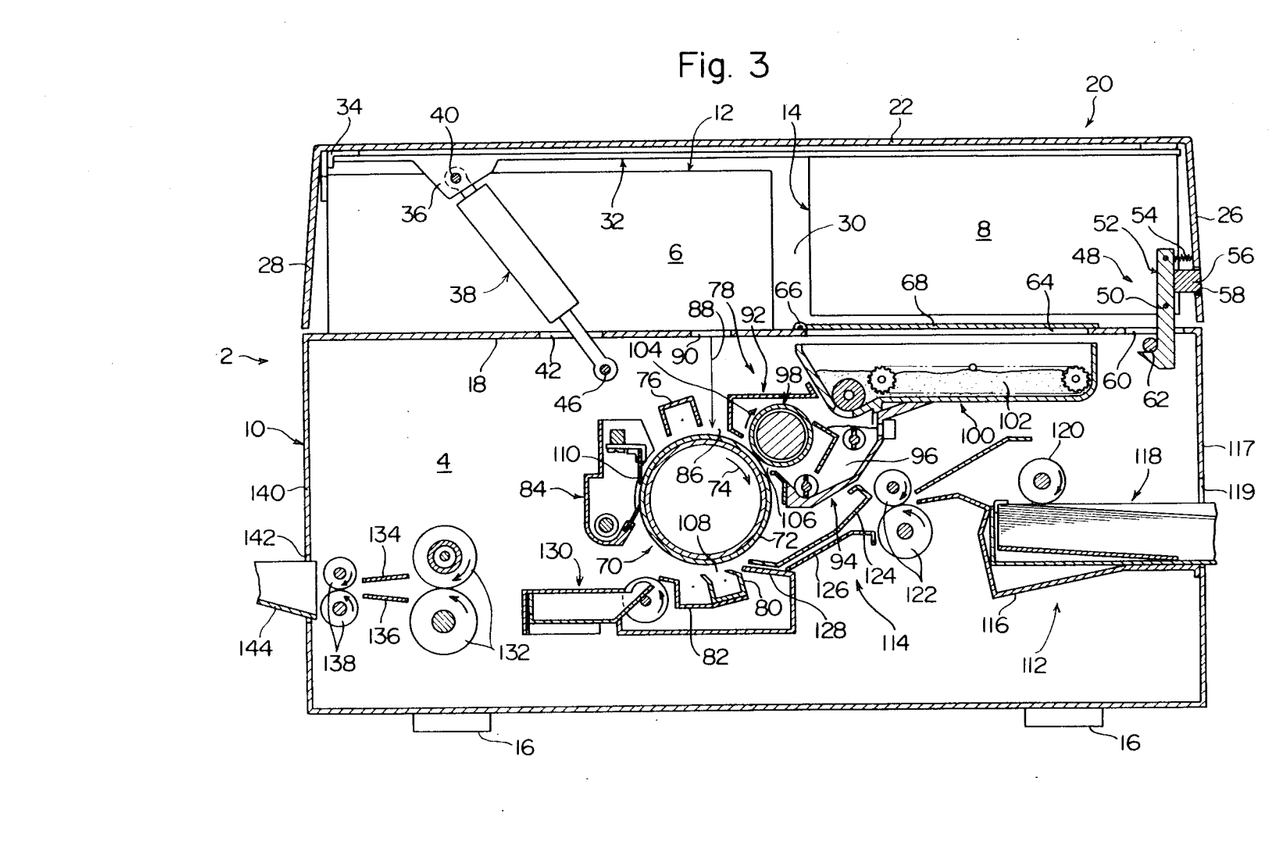
FIG. 3 is a simplified sectional view of the image-forming apparatus of FIG. 1.

With reference to FIGS. 1, 2 and 3, the general construction of the image-forming apparatus shown generally at 2 is described.

The image-forming apparatus 2 shown includes an electrostatic image-forming means shown generally at 4, an optical means shown generally at 6 and a control means shown generally at 8. The image-forming means 4 is composed of an image-forming unit having a first housing 10 which is relatively large and nearly rectangular-parallelpipedal. The optical means 6 is composed of an optical unit having a second housing 12 which is relatively small and nearly rectangular-parallelpipedal. The control means 8 is formed of a control unit having a third housing 14 which is relatively small and nearly rectangular-parallelpipedal. As will be described in detail hereinafter, the optical means 6 projects a scanned light beam to be controlled according to an image to be formed. The image-forming means 4 receives the scanned light beam projected from the optical means 6 and forms an image corresponding to the scanned light beam. The control means 8 controls the optical means 6 and the image-forming means 4 as required.

The first housing 10 of the image-forming means 4 has legs 16 at tis lower surface, and is placed on a suitable supporting base stand such as a floor surface. The second housing 12 of the optical means 6 is fixed to one side portion (the left side portion in FIG. 3) of a substantially horizontal upper wall 18 of the first housing 10 by suitable means (not shown) such as screwing.

The image-forming apparatus 2 has a cover shown generally at 20. The cover 20 has a nearly rectangular upper wall 22 and four side walls 24, 26, 28 and 30 extending downwardly from the upper wall 22. As shown in FIGS. 2 and 3, a supporting plate 32, nearly rectangular in shape, is fixed to the inside surface of the upper wall 22 of the cover 20 by suitable means (not shown) such as screwing. That end of the supporting plate 32 which is located on the left in FIG. 3 is pivotally linked to one side wall of the second housing 12, i.e. the upper end of the outside surface of that side wall which is located on the left in FIG. 3, by a pair of hinge linking means 34. Thus, the cover 20 is mounted such that it can be opened counterclockwise in FIG. 3 from its closed position shown in FIGS. 1 and 3 about a hinge pin of the hinge linking means 34 as a center. The supportng plate 32 has integrally formed therein a downwardly extending portion 36 which extends downwardly from its one side edge near its left end portion in FIG. 3. To the downwardly extending portion 36 is pivotally linked by means of a pin 40 one end of a gas spring means 38 known per se. The other end of the gas spring means 38 extends to the inside of the first housing 10 through an opening 42 formed in the upper wall 18 of the first housing 10, and is pivotally linked by means of a pin 46 to a bracket 44 (FIG. 2) fixed within the first housing 10. The gas spring means 38 biases the cover 20 counterclockwise in FIG. 3. There is also provided a locking mechanism 48 (FIG. 3) for locking the cover 20 in the closed position against the biasing action of the gas spring means 38. As illustrated in FIG. 3, the locking mechanism 48 includes a locking member 52 mounted pivotally on a pin 50 projecting rearwardly from the front side wall 24 of the cover 20. A spring 54 is provided taut between the upper end portion of the locking member 52 and the right side wall 26 of the cover 20. The spring 54 biases the locking member 52 clockwise in FIG. 3 and elastically holds it at a locking position shown in FIG. 3. A pressing member 56 is fixed to the locking member 52, and the free end of the pressing member 56 is located within an opening 58 formed in the right side wall 26 of the cover 20. On the other hand, an opening 60 is formed at that portion of the upper wall 18 of the first housing 10 which corresponds to the locking member 52, and an engaging pin 62 is disposed below the opening 60. When the cover 20 is pivoted clockwise in FIG. 3 from its open position shown in FIG. 2 and brought to a point near its closed position shown in FIG. 3, the hook-like lower end portion of the locking member 52 advances into the first housing 10 through the opening 60 and its undersurface abuts against the engaging pin 62. Hence, when pivoting of the cover 20 is continued, the action of the engaging pin 62 causes the locking member 52 to pivot counterclockwise in FIG. 3 against the elastic biasing action of the spring 54. When the cover 20 is pivoted to the closed position shown in FIG. 3, the hook-like lower end portion of the locking member 52 goes beyond the engaging pin 62. As a result, the locking member 52 is pivoted clockwise and returned to the locking position by the elastic biasing action of the spring 54. Thus, as shown in FIG. 3, the hook-like lower end portion of the locking member 52 comes into engagement with the engaging pin 62 whereby the cover 20 is locked in the closed position shown in FIG. 3. To open the cover 20, the hook-like lower end portion of the locking member 52 is detached from the engaging pin 62 by pushing with a finger the free end of the pressing member 56 fixed to the locking member 52 and thereby pivoting the locking member 52 counterclockwise. Consequently, the cover 20 is pivoted counterclockwise in FIG. 3 by the biasing action of the gas spring means 38. When the cover 20 has been pivoted to its open position shown in FIG. 2, the biasing action of the gas spring means 38 comes into equilibrium with the moment ascribable to the weight of the cover 20 (as will be clear from the following description, the weight also includes the weight of the control means 8 mounted on the cover 20). The cover 20 is thus maintained stably at the open position shown in FIG. 2.

In the illustrated image-forming apparatus 2, the housing of the control means 8, namely the third housing 14, is mounted in the cover 20 by fixing its upper surface to the supporting plate by suitable means (not shown) such as a setscrew. Since the control means 8 is relatively light in weight, mounting of the third housing 14 in the cover 20 does not cause any inconvenience. As is clearly seen from FIG. 3, when the cover 20 is at its closed position at which it covers the upper surface of the first housing 10 of the image-forming means 4 and the second housing 12 of the optical means 6, the third housing 14 mounted in the cover 20 and moving together with the cover 20 is at its operating position at which it is located adjacent to the second housing 12 and above the first housing 10 with some distance from the upper wall 18 of the first housing 10. On the other hand, when the cover 20 is at its open position at which it exposes the upper surface of the first housing 10 and the second housing 12 to view, the third housing 14 is brought to its non-operating position at which it is apart from the upper surface of the first housing 10, as is clear from FIG. 2.

As shown in FIGS. 2 and 3, a relatively large opening 64 which enables access to the inside of the first housing 10 is formed in at least a part of that area of the upper wall 18 of the first housing 10 which is exposed to view when the cover 20 is held at the open position to hold the third housing 14 at the non-operating position. The opening 64 is closed by a freely openable and closable closure member 68 whose one end edge (the left end edge in FIG. 3) is pivotally connected to the upper wall 18 by a pair of hinge linking means 66.

As will be clear from the description made hereinafter, it is occassionally necessary to get access to the various constituent elements accommodated in the first housing 10 in order, for example, to supply or exchange developers or to clean or exchange the electrostatographic material. In this case, the cover 20 is first pivoted to the open position to bring the third housing 14 to its non-operating position. Then, the closure member 68 is pivoted counterclockwise in FIG. 3 from its closed position shown in FIG. 3 to expose the opening 64. As a result, one can easily get access to the inside of the first housing 10 through the opening 64. As will also be clear from the description made hereinafter, the second housing 12 accommodates therein various constituent elements which must be held fully accurately at the required positions and protected from contamination by the developers, dust and dirt, etc. When access to the inside of the first housing 10 is obtained as described above, the second housing 12 remains unmoved and unopened, and therefore, there is no fear of adverse effects on the various constituent elements disposed in the second housing 12.

Electrostatic image-forming means

Now, the electrostatic image-forming means 4 composed of the image-forming unit having the first housing 10 will be described in detail.

With reference to FIG. 3, a cylindrical rotating drum 70 is rotatably mounted nearly centrally in the first housing 10. A suitable electrostatographic material 72 is disposed on the peripheral surface of the rotating drum 70.

Around the rotating drum 70 to be rotated in the direction of an arrow 74 are disposed a charging corona discharge device 76, a developing means generally shown at 78, a transfer corona discharge device 80, a peeling corona discharge device 82 and a cleaning means shown generally at 84 in this order in the rotating direction of the drum 70. The charging corona discharge device 76 substantially uniformly charges the electrostatographic material 72 to a specified polarity. An exposure area 86 exists between the charging corona discharge device 76 and the developing means 78. In the exposure zone 86, a scanned light beam advancing from the optical means 6 to the inside of the first housing 10 through an opening 90 formed in the upper wall 18 of the first housing 10 is projected onto the electrostatographic material 72, thereby to form a latent electrostatic image corresponding to the scanned light beam on the electrostatographic material 72. The opening 90 is of an elongated shape extending axially of the rotating drum 70, namely in a direction perpendicular to the sheet surface in FIG. 3. The inner surface of the upper wall 18 which is near the opening 90 and the surface of frame materials of the charging corona discharge device 76 and the developing means 78 which face the path of the scanned light beam shown by an arrow 88 are conveniently coated in a dark color or covered with a felt or the like of a dark color in order to re-reflect the scanned light beam reflected from the electrostatographic material 72 without absorption. This prevents the scanned light beam reflected by the electrostatographic material 72 from being reflected again toward the electrostatographic material 72 and thus disturbing the latent electrostatic image formed on it.

The illustrated developing means 78 includes a main developing portion 92 having a casing 94 holding a two-component developer 96 composed of carrier particles and toner and a developer applicator means 98 disposed within the casing 94, and a toner supplying portion 100 for supplying toner 102 therein to the casing 94 as required. The developer applicator means 98 of the main developing portion 92 is rotated in the direction of an arrow 104 and magnetically attracts a developer 96 in the casing 94 to its surface to form a so-called "magnetic brush", and applies the magnetic brush to the electrostatographic material 72 through an opening 106 formed in the casing 94. Thus, the toner is applied to the latent electrostatic image formed on the electrostatographic material 72 to develop it to a toner image. The transfer corona discharge device 80 applies a corona discharge to the back surface of a copying paper to be contacted with the surface of the electrostatographic material 72 in a transfer zone 108 to transfer the toner image on the electrostatographic material 72 to the copying paper. The peeling corona discharge device 82 applies corona discharge to the back surface of the copying paper immediately downstream of the transfer zone 108 to peel the electrostatically adhering copying paper from the surface of the electrostatographic material 72.

The cleaning means 84 has a blade 110 made of an elastic material to be pressed against the surface of the electrostatographic material 72, and by the action of the blade 110, removes residual toner particles from the electrostatographic material 72.

The image-forming means 4 further includes a copying paper feed means shown generally at 112, and a copying paper conveying means shown generally at 114 for conveying a copying paper fed from the copying paper feed means 112 through the transfer zone 108. The paper feed means 112 has a cassette receiving stand 116, a copying paper cassette 118 mounted detachably on the cassette receiving stand 116 through an opening 110 formed on the right side wall 117 of the first housing 10, and a feed roller 120. The feed roller 120 is rotated selectively in the direction shown by an arrow and delivers a plurality of copying paper sheets stacked in the copying paper cassette 118 one by one. The copying paper conveying means 114 includes a pair of conveying rollers for conveying a copying paper fed from the paper feed means 112, guide plate means 124, 126 and 128 for guiding the copying paper conveyed by the pair of conveying rollers to the transfer zone 108, a sucking-type conveying and guiding mechanism 130 for conveying and guiding the copying paper peeled from the electrostatographic material 72, a pair of fixing rollers 132, guide plate means 134 and 136, a pair of delivery rollers 138, and a receiving tray 144 for receiving the copying paper discharged from the pair of delivery rollers 138 through an opening 142 formed in the left side wall 140 of the first housing 10. One of the pair of fixing rollers 132, i.e. the roller 132 located above, has formed therein a heating element. The pair of fixing rollers 132 press and heat the surface of the copying paper having a toner image transferred thereto from the electrostatographic material 72, and thereby fix the toner image onto the copying paper.

The aforesaid construction itself of the image-forming means 4 is conventional and does not constitute any novel feature of the image-forming apparatus 2 constructed in accordance with this invention. Accordingly, a detailed description of the aforesaid construction in the image-forming means 4 will be omitted in the present specification.

When in the image-forming means 4 described above, the toner in the toner supplying portion 100 of the developing means 78 has been consumed and it is necessary to load the toner in the toner supplying portion 100, the cover 20 is pivoted to the open position shown in FIG. 2 to bring the third housing 14 (i.e., the housing of the control means 8) at the non-operating position shown in FIG. 2, and then the closure member 68 is opened to expose the opening 64 formed in the upper wall 18 of the first housing 10. As a result, the toner can be loaded into the toner supplying portion 100 through the opening 64. In the case of repair of the developing means 78 or the cleaning or exchanging of the electrostatographic material 72, the developing means 78 and the rotating drum 70 can be detached and taken out as required through the opening 64.

Optical means

The optical means 6 composed of the optical unit having the second housing 12 will now be described in detail.

(A) Construction of the optical means

Figure 4:
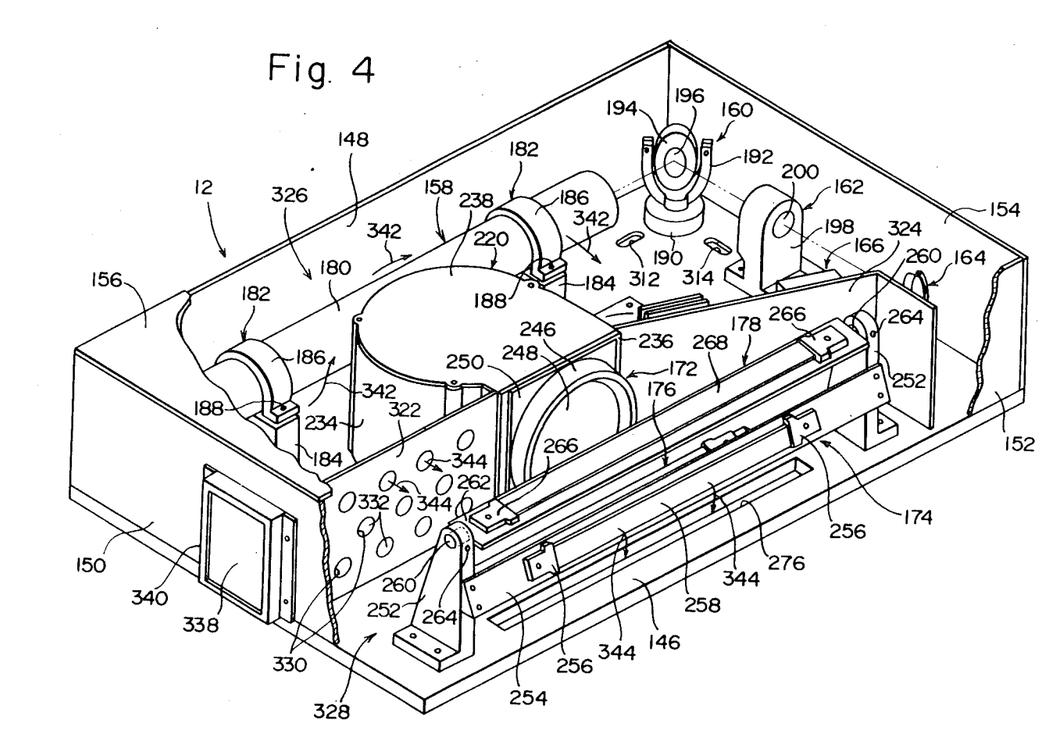
FIG. 4 is a perspective view, partly broken away, of an optical means in the image-forming apparatus of FIG. 1.
Figure 5:
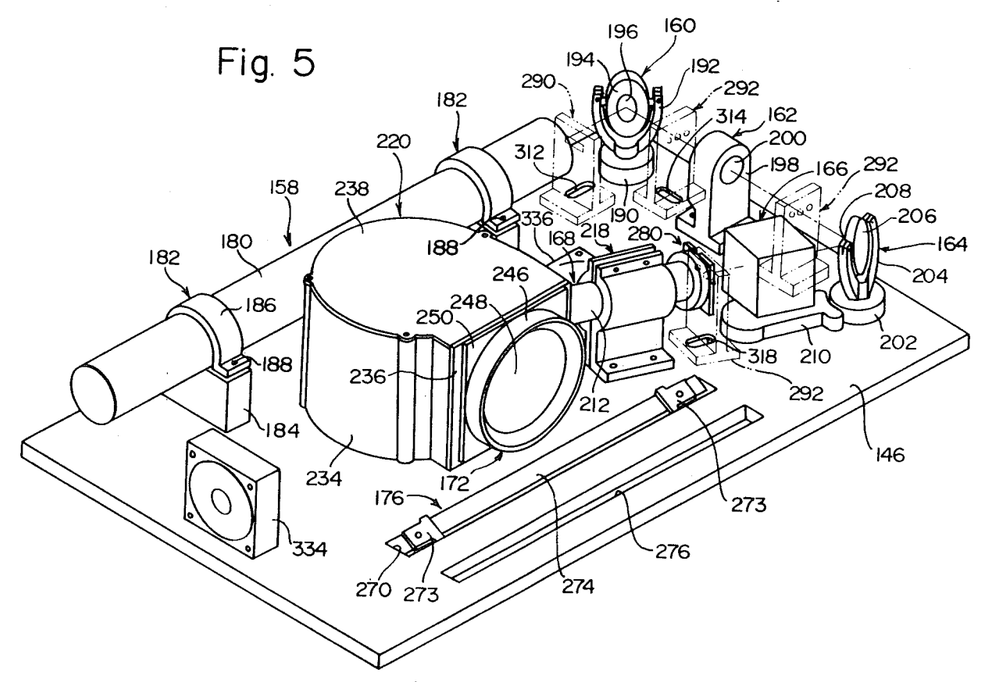
FIG. 5 is a perspective view showing the optical means of FIG. 4 partly detached.
Figure 6:
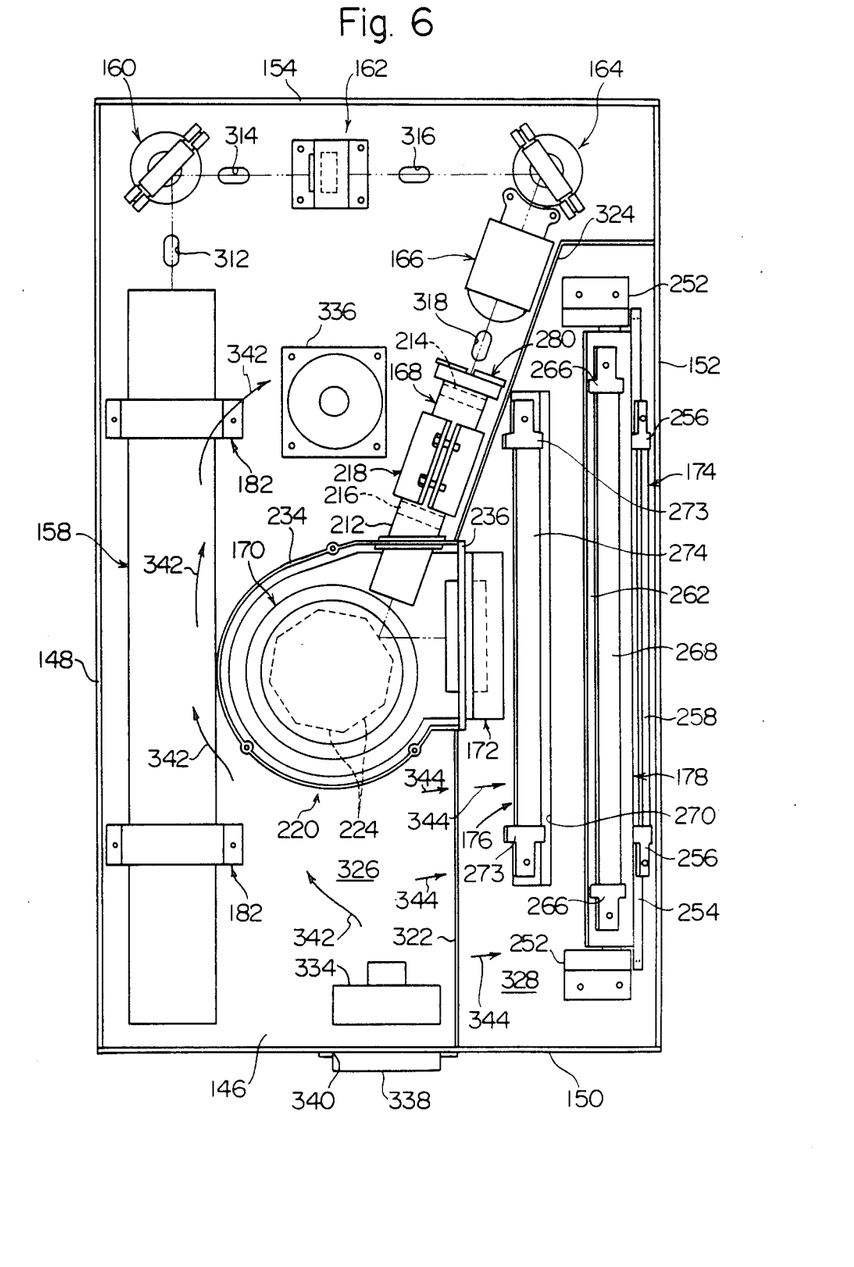
FIG. 6 is a top plan view of the optical means of FIG. 4 with the upper wall of its housing detached.

With reference to FIG. 4, the housing of the optical means 6, i.e. the second housing 12, is defined by a bottom wall 146, four side walls 148, 150, 152 and 154 and an upper wall 156. With reference to FIGS. 5 and 6 as well as FIG. 4, a light beam generating means 158, a first reflecting mirror assembly 160, a first lens assembly 162, a second reflecting mirror assembly 164, a modulating means 166, a second lens assembly 168 (FIGS. 5 and 6), a scanning means 170 (FIG. 6), a third lens assembly 172, a third reflecting mirror assembly 174, a fourth reflecting mirror assembly 176 and a fifth reflecting mirror assembly 178 are mounted on the bottom wall 146 of the second housing 12.

The light beam generating means 158 is constructed of a gas laser tube having a cylindrical casing 180. The light beam generating means 158 is mounted on the bottom wall 148 by a pair of supporting means 182 such that it is adjacent to the side wall 148 and extends substantially parallel to the bottom wall 146 and the side wall 148. Each of the pair of supporting means 182 consists of a supporting stand 184 fixed to the bottom wall 146 and a nearly semicircular arcuate holding member 186 cooperating with the supporting stand 184. A nearly semicircular recess is formed on the upper surface of the supporting stand 184. The light beam generating means 158 is positioned in the recess of the support stand 184 and then the holding member 186 is provided astride the light beam generating means 158. Then, the flange portions at both ends of the holding member 186 are fixed to the supporting stand 184 by a setscrew 188, thereby mounting the light beam generating means 158 on the bottom wall 146.

The first reflecting mirror assembly 160 is comprised of a supporting stand 190 fixed to the bottom plate 146, a nearly U-shaped holding member 192 mounted on the support stand 190, a supporting member 194 mounted on the holding member 192, and a mirror 196 secured to the supporting member 194. The holding member 192 is mounted on the supporting stand 190 so that its rotating angular position about a substantially perpendicular axis can be freely adjusted. The supporting member 194 is mounted on the holding member 192 so that its rotating angular position about a substantially horizontal axis can be freely adjusted.

The first lens assembly 162 is comprised of a supporting member 198 fixed to the bottom wall 146 so that its position can be freely adjusted, and a condensing lens 200 fixed within a through hole formed in the upper portion of the supporting member 198.

The second reflecting mirror assembly 164 is substantially the same as the first reflecting mirror assembly 160 described above, and is comprised of a supporting stand 202 fixed to the bottom wall 146, a nearly U-shaped holding member 204 mounted on the supporting stand 202, a supporting member 206 mounted on the holding member 204 and a mirror 208 fixed to the supporting member 206. The holding member 204 is mounted on the supporting stand 202 such that its rotating angular position about a substantially perpendicular axis can be freely adjusted, and the supporting member 206 is mounted on the holding member 204 such that its rotating angular position about a substantially horizontal axis can be freely adjusted.

The modulating means 166 may be constructed of a suitable modulator such as a known acousto-optical modulator, and is fixed to a supporting stand 210 which is fixed to the bottom plate 146 in such a manner that its position can be freely adjusted.

Figures 7, 8, 9, 10, 11:
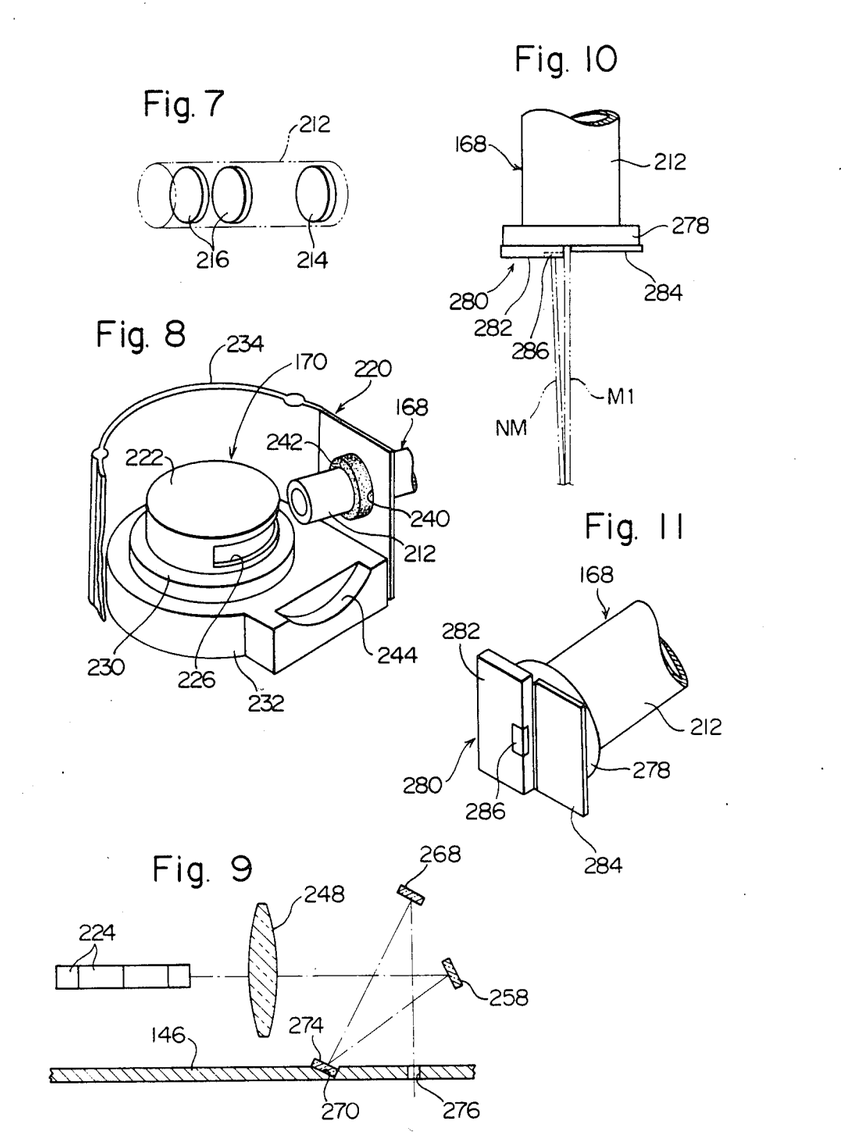
FIG. 7 is a simplified schematic view showing a second lens assembly in the optical means of FIG. 4.
FIG. 8 is a perspective view, partly broken away, of a casing and its surrounding structure in the optical means of FIG. 4.
FIG. 9 is a simplified schematic view of the path of a scanned light beam in the optical means of FIG. 4.
FIG. 10 is a top plan view showing a light shielding means and a light beam detecting means in the optical means of FIG. 4.
FIG. 11 is a perspective view showing the light shielding means and light beam detecting means of FIG. 10.

The second lens assembly 168 has a cylindrical lens frame 212. As schematically shown in FIG. 7, one collimator lens 214 and a plurality of (two in the drawing) expander lenses 216 are disposed within the lens frame 212. The lens frame 212 is mounted on the bottom wall 146 by a conventional supporting means 218 composed of a pair of supporting members so that its longitudinal position can be freely adjusted. One end portion of the lens frame 212 extends through the side wall of a casing shown generally at 220 and described in detail hereinafter, and is mounted on the casing 220 such that it can move freely in the longitudinal direction.

With reference to FIG. 8 also, the scanning means 170 is constructed of a rotating polygon mirror assembly known per se which has a nearly cylindrical case 222. The case 222 of the rotating polygon mirror assembly has accommodated therein a plurality of (8 in the drawing) scanning mirrors 224 (FIGS. 6 and 9) arranged in a polygonal shape and an electric motor (not shown) for rotating the scanning mirrors 224 at high speeds. An opening 226 is formed in the case 222 so as to permit falling of a light beam upon the scanning mirrors 224 and outgoing of a scanned light beam from the scanning mirrors 204. An annular holding member 230 is fixed around the case 222. The annular holding member 230 is fixed to a supporting stand 232 secured to bottom wall 146. Thus, the scanning means 170 composed of the rotating polygon mirror assembly is fixed to a predetermined position on the bottom wall 146.

With reference to FIGS. 5, 6 and 8, the scanning means 170 is surrounded by the casing 220. The casing 220 has a nearly arcuate upstanding side wall 234 extending along the contour of the supporting stand 232, an upstanding front wall 236 fixed between the two ends of the side plate 234 and an upper wall 238 closing the upper surface of the casing 220. The lower surface of the casing 220 is closed by the supporting stand 232 and the bottom wall 146. The side wall 234 of the casing 220 has formed therein a circular opening for incoming of a light beam through which one end portion of the lens frame 212 of the second lens assembly 168 extends. Preferably, an annular sealing material 242 made of a flexible material such as rubber is disposed in the opening 240 so as to seal substantially the space between the side wall 234 and the lens frame 212 while permitting movement of the lens frame 212 in the longitudinal direction. A nearly circular opening for outgoing of a light beam is formed in the front wall 236 of the casing 220. This opening, in cooperation with an arcuate recessed portion 244 (FIG. 8) formed in the front end of the supporting stand 232, defines a mounting portion for the third lens assembly 172 The third lens assembly 172 has a short cylindrical lens frame 246, a so-called f-θ lens 248 fixed within the lens frame 246, and a linking plate 250 fixed to the peripheral surface of the lens frame 246. The third lens assembly 172 is mounted at a predetermined position by inserting one end portion of the lens frame 246 in a circular mounting portion defined by the opening formed in the front wall 236 and the arcuate recessed portion 244 formed in the supporting stand 232, and fixing the linking plate 250 to the front wall 236.

It will be understood from the above description of the casing 220 that the scanning means 170 constructed of the rotating polygon mirror assembly is substantially closed by the casing 220 and the two lens assemblies mounted on the casing 220, i.e. the second lens assembly 168 located upstream of the scanning means 170 as viewed in the advancing direction of the light beam and the third lens assembly 172 located downstream of the scanning means 170 as viewed in the advancing direction of the light beam. As is well known, in the rotating polygon mirror assembly, the scanning mirrors 224 are rotated at high speeds, and therefore considerably noises are produced. Propagation of these noises can be considerably reduced by substantially closing the rotating polygon mirror assembly as described above.

With reference to FIGS. 4 and 6, a pair of supporting stands 252 spaced from each other a predetermined distance are fixed to the bottom wall 146. The third reflecting mirror assembly 174 and the fifth reflecting mirror assembly 174 are mounted between the pair of supporting stands 252. The third reflecting mirror assembly 174 has a supporting plate 254 both ends of which are fixed respectevely to the side edges of the supporting stand 252. A mirror 258 is fixed to the back surface of the supporting plate 254 by means of a pair of fixing devices 256. The supporting plate 254 has formed therein an elongated opening extending in its longitudinal direction, and the main front surface portion of the mirror 258 is exposed to view through this opening. The fifth reflecting mirror assembly 178 has a supporting plate 262 having short shafts 260 formed at its opposite ends. By rotatably mounting the short shafts 260 formed at the opposite ends of the supporting plate 262 in holes formed at the upper end portions of the supporting stand 252 and hampering the rotation of the short shafts 260 by a setscrew 264 which advances into each of the holes from the side edge of each of the supporting stands 252 and abuts against each short shaft 260, the supporting plate 262 is mounted between the pair of supporting stand 252 such that its rotating angular position about its longitudianl axis can be freely adjusted. A mirror 268 is fixed to the back surface of the supporting plate 262 by a pair of fixing devices 266. The supporting plate 262 has formed therein an elongated opening which extends longitudinally thereof, and the main front surface portion of the mirror 268 is exposed to view through this opening.

With reference to FIGS. 5, 6 and 9, an elongated recessed portion 270 having a nearly triangular cross section is formed in the bottom wall 146, and the fourth reflecting mirror assembly 176 has a mirror 272 fixed to the recessed portion 270 by a pair of fixing devices 273.

In the optical means 6 described above, as shown by the one-dot chain lines in FIGS. 4, 5 and 6, a laser light beam generated by the light beam generating means 158 arrives at the mirror 196 of the first reflecting mirror assembly 160 and is reflected by the mirror 196. The reflected light beam passes through the condenser lens 200 of the first lens assembly 162, and arrives at the mirror 208 of the second reflecting mirror assembly 164 where it is reflected by the mirror 208. The reflected mirror then falls upon the modulating means 166. As will be described hereinafter, the modulating means 166 modulates the laser light beam according to image signals fed from the control means 8 (FIG. 3). As will be clear from the1description made hereinafter, only a modulated primary light beam among the laser light beams coming from the modulating means 166 falls upon the second lens assembly 168. The laser light beam incident to the second lens assembly 168 is converyed to a parallel light by being passed through the collimator lens 214 (FIG. 7), and then by passing it through a plurality of expander lenses 216 (FIG. 7), its beam diameter is adjusted to the desired value. The laser light beam which has passed through the second lens assembly 168 arrives at the scanning mirrors 224 of the scanning means 170, and by the action of the scanning mirrors 224 rotating at high speeds, it is projected as a scanned laser light beam reciprocally scanned in the left-right directions in FIG. 6. The scanned laser light beam projected from the scanning means 170 passes through the f-θ lens 248 of the third lens assembly 172, and thereafter is reflected successively by the mirror 258 of the third reflecting mirror assembly 174, the mirror 274 of the fourth reflecting mirror assembly 176 and the mirror 268 of the fifth reflecting mirror assembly 178. The laser light beam reflected by the fifth reflecting mirror assembly 178 goes out from the second housing 12 after it has passed through the light beam passing opening 276 formed in the bottom wall 146, advances into the first housing 10 through the opening 90 formed in the upper wall 18 of the first housing 10, and arrives at the electrostatographic material 72 disposed on the peripheral surface of the rotating drum 70 in the exposure zone 86 as stated hereinabove. It is necessary that the mirrors 258, 274 and 268 of the third to fifth reflecting mirror assemblies 174, 176 and 178 are disposed substantially parallel to the central axis of the rotating drum 70 (FIG. 3), and the opening 276 formed in the bottom wall 146 should be in alignment with the opening 90 formed in the upper wall 18 of the first housing 10 and extends substantially parallel to the central axis of the rotating drum 70. On the other hand, it is preferred that the angle of the mirror 268 of the fifth reflecting mirror assembly 178 is prescribed so that the path of the laser light beam ranging from the mirror 268 of the fifth reflecting mirror assembly 178 to the electrostatographic material 72 slightly deviates with respect to the central axis of the rotating drum 70. If the path of the laser light beam ranging from the mirror 268 to the electrostatographic material 72 is in alignment with the central axis of the rotating drum 70, a part of the laser light beam arriving at the electrostatographic material 72 is reflected by the electrostatographic material 72 and then by being reflected by the mirrors 268, 274 and 258, returns to the scanning mirrors 224 of the scanning means 170, and thereafter is again projected onto the electrostatographic material 72. This may possibly result in disturbance of the latent electrostatic image formed on the electrostatographic material 72.

In the illustrated optical means 6, a shielding means is provided which causes only a modulated primary light beam among the laser light beams from the modulating means 166 to fall upon the second lens assembly 168. With reference to FIGS. 10 and 11 together with FIGS. 5 and 6, an annular flange 278 is formed integrally at the upstream end, viewed in the advancing direction of the light beam, of the cylindrical lens frame 212 of the second lens assembly 168, and a light shielding means 280 is fixed to the flange 278. The light shielding means 280 is comprised of a pair of light shielding plates 282 and 284 spaced from each other some distance and fixed to the flange 278. As can be seen from FIG. 10, the distance between the pair of light shielding plates 282 and 284 is substantially equal to the diameter of a modulated primary light beam M1 existing when image signals, i.e. modulation signals, have been fed to the modulating means 166, and the light shielding plates are positioned so that they permit passage of only the modulated primary light beam M1 from the modulating means 166. A non-modulated light beam NM existing when no image signal is fed to the modulating means 166 is shut off by the light shielding plate 282 and cannot fall upon the second lens assembly 168. As is wall known to those skilled in the art, when image signal have been fed to the modulating means 166, not only the modulated primary light beam M, by also weak secondary, tertiary . . . light beams having a larger angle of deflection to the non-modulated light beam NM than the angle of deflection of the modulated primary light beam M1 exist. These secondary, tertiary, . . . light beams are shut off by the light shielding plate 284 and cannot fall upon the second lens assembly 168.

A light beam detector 286 which may be constructed of a photocell, for example, is disposed in that area of the light shielding plate 282 upon which a non-modulated light beam NM falls. The light beam detector 286 produces a signal corresponding to the intensity of the projected non-modulated light beam NM and feeds it to the control means 8 to be described in detail hereinafter. The control means 8 compares the signal fed from the light beam detector 286 with a predetermined standard value, and produces a warning signal when the intensity of the non-modulated light beam NM falls below a predetermined value as a result of the degradation of the light beam generating means 158. When the warning signal is produced, a warning lamp (not shown) provided in a panel 288 (FIG. 1) disposed on the surface of the cover 20 is turned on.

Since the light beam detector 286 detects the non-modulated light beam NM not used for the formation of a latent electrostatic image in the image-forming means 4, it does not adversly affect the image-forming action of the means 4. Furthermore, because the non-modulated light beam NM can exist for a relatively long period of time, a signal which the light beam detector 286 produces according to the intensity of the non-modulated light beam NM also exists over a relatively long period of time, and comparison, etc. of the signal can be easily and accurately effected. Furthermore, since the light beam detector 286 detects the non-modulated light beam NM, it can directly examine a light beam generated by the light beam generating means without being affected by the function of the modulating means 166.

(B) Optical adjustment in the optical means

Figure 12:
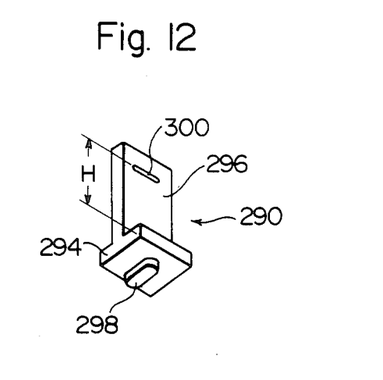
FIG. 12 is a perspective view showing one embodiment of a first adjusting jig used in optical adjustment in the optical means of FIG. 4.
Figure 13:
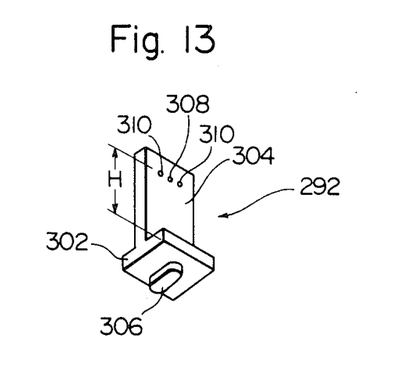
FIG. 13 is a perspective view showing one embodiment of a second adjusting jig used in optical adjustment in the optical means of FIG. 4.

It will be easily understood that in the above optical means 6, it is important for the optical axis of the modulated primary light beam M1 from the modulating means to be fully and precisely in alignment with the optical axis of the second lens assembly 168. For this purpose, it is important that the light beam generating means 158, the mirror 196 of the first reflecting mirror assembly 160, the condensing lens 200 of the first lens assembly and the modulating means 166 should be held fully precisely at predetermined positions. In order to enable such a positioning operation to be carried out rapidly and easily, one specific embodiment of this invention utilizes one first adjusting jig 290 of the shape shown in FIG. 12 and two second adusting jigs 292 of the shape shown in FIG. 13. The first adjusting jig 290 shown in FIG. 12 has a horizontal base portion 294 and an upstanding portion 296 extending upwardly from the upper surface of the base portion 294. A positioning projection 298 is formed on the lower surface of the base portion 294. On the other hand, a horizontally extending elongated beam hole 300 is formed in the upstanding portion 296 at a predetermined height H from the lower surface of the base portion 294. The size of the beam hole 300 in the height direction may be about 0.8 mm. Preferably, the first adjusting jig 290 is formed symmetrical with respect both to a central vertical surface parallel to the upstanding portion 296 and a central vertical surface perpendicular to the upstanding portion 296 in order that it can be used without considering its surface and back (the surface and back of the upstanding portion 296). Each of the second adjusting jigs 292 shown in FIG. 13 also has a horizontal base portion 302 and an upstanding portion 304 extending upwardly from the upper surface of the base portion 302. A positioning projection 306 is formed on the lower surface of the base portion 302. On the other hand, three beam holes, i.e. a central beam hole 308 located centrally, and two side beam holes 310 located on both sides of the central beam hole 308 each at an equal distance from the central beam hole 308 are formed in the upstanding portion 304 at a predetermined height H (which is substantially equal to the height H in the first adjusting jig 290). The diameters of the beam holes 308 and 310 may be about 0.8 mm. Preferably, the second adjusting jigs 292 are also formed symmetrical both with respect to a central vertical surface parallel to the upstanding portion 304 and a central vertical surface perpendicular to the upstanding portion 304 in order that they can be used without consideration to their surface and back. As will be seen from the description made hereinafter, only one side beam hole 310 may be sufficient, but two holes 310 are formed in this embodiment so that the jigs can be used without consideration to their surface and back.

With reference to FIGS. 5 and 6, a plurality of positioning recesses having shapes corresponding to the shapes of the projections 298 and 306 are formed on the upper surface of the bottom wall 146 so as to position the first and second adjusting jigs 290 and 292 therein. Specifically, a first recess 312 is formed at a predetermined position between the light beam generating means 158 and the first reflecting mirror assembly 160. A second recess 314 is formed at a predetermined position between the first reflecting mirror assembly 160 and the first lens assembly 162. A third recess 316 is formed between the first lens assembly 162 and the second reflecting mirror assembly 164. A fourth recess 318 is formed between the modulating means 166 and the second lens assembly 168.

A method of optical adjustment utilizing the first and second adjusting jigs 290 and 292 will now be described.

In the first step of adjustment, a light beam from the light beam generating means 158 is adjusted to a predetermined height H from the upper surface of the bottom wall 146. As is well known to those skilled in the art, in a gas laser tube constituting the light beam generating means 158, the central axis of the cylindrical casing 180 does not necessarily align with the optical axis of the generated light beam, and frequently some error exists between them. Hence, even when the casing 180 is positioned fully accurately by the pair of supporting means 182 so that it extends parallel to the bottom wall 146 at the predetermined height H from the upper surface of the bottom wall 146, the optical axis of the generated light beam frequently does not have the predetermined height H. To adjust the optical axis of the generated light beam to the predetermined height H, the first adjusting jig 290 is held at a predetermined position between the light beam generating means 158 and the first reflecting mirror assembly 160 by inserting the projection 298 of the first adjusting jig 290 into the first recess 312. Then, by rotating the casing 180 with its central axis as a center so that the generated light beam passes through the beam hole 300 of the first adjusting jig 290, as shown by the two-dot chain line in FIG. 5. Thus, the light beam from the light beam generating means 158 is adjusted such that it advances substantially parallel to the bottom wall 146 at the predetermined height H. After this adjustment is over, the first adjusting jig 290 is removed.

In the second step of adjustment, the position of the mirror 196 of the first reflecting mirror assembly 160 is adjusted. In performing this adjustment, one second adjusting jig 292 is held at a predetermined position between the first reflecting mirror assembly 160 and the first lens assembly 162 by inserting the projection 306 of the second adjusting jig 292 into the second recess 314, and the other second adjusting jig 292 is held at a predetermined position between the first lens assembly 162 and the second reflecting mirror assembly 164 by inserting the projection 306 of the other second adjusting jig 292 into the third recess 316, as shown by the two-dot chain line in FIG. 5. Then, the first lens assembly 162 is detached, and the position of the mirror 196 of the first reflecting mirror assembly 160 is adjusted so that the light beam reflected by the mirror 196 passes through one of the two side beam holes 310 of the second adjusting jig 292, i.e. the side beam hole 310 located on the left in the advancing direction of the light beam. The position of the mirror 196 is adjusted by adjusting the rotating angular position of the retaining member 192 about a substantially vertical axis and the rotating angular position of the supporting member 194 about a substantially horizontal axis. When the adjustment is over, the second adjusting jig 292 positioned between the first reflecting mirror assembly 160 and the first lens assembly 162 is removed. However, the second adjusting jig 292 positioned between the first lens assembly 162 and the second reflecting mirror assembly 164 is retained without removal.

In the third step of adjustment, the first lens assembly 162 detached in the second step is installed. The installing position of the first lens assembly 162 is adjusted so that the light beam passing through the condensing lens 200 passes through the central beam hole 308 of the second adjusting jig 292 positioned between the second lens assembly 162 and the second reflecting mirror assembly 164. When this adjustment is completed, the second adjusting jig 292 is removed.

In the fourth step of adjustment, the position of the mirror 208 of the second reflecting mirror assembly 164 is adjusted. In performing this adjustment, the second adjusting jig 292 is held at a predetermined position between the modulating means 166 and the second lens assembly 168 by inserting the projection 306 of the second adjusting jig 292 into the fourth recess 318 as shown by the two-dot chain line in FIG. 5. The modulating means 166 and the supporting stand 210 to which the modulating means 166 is fixed are detached. Then, the position of the mirror 208 of the second reflecting mirror assembly 164 is adjusted so that the light reflected by the mirror 208 passes through the central beam hole 308 of the adjusting jig 292. The position of the mirror 208 is adjusted by adjusting the rotating angular position of the holding member 204 about a substantially vertical axis and the rotating angular position of the supporting member 206 about a substantially horizontal axis.

In the fifth step of adjustment, the supporting stand 210 and the modulating means 166 detached in he fourth step are installed. The installing position of the supporting stand 210 is adjusted so that the non-modulated light beam NM (see FIG. 10) from the modulating means 166 passes through one of the two side beam holes 310 of the second adjusting jig 292 positioned between the modulating means 166 and the second lens assembly 168, i.e. the side beam hole 310 located on the left in the advancing direction of the light beam, and the modulated primary light beam M1 (see FIG. 10) from the modulating means 166 passes through the central beam hole 308 of the second adjusting jig 292. After the adjustment is completed, the second adjusting jig 292 is removed.

By the procedure described above, the optical axis of the modulated primary light beam M1 (see FIG. 10) from the modulating means 166 is brought into fully precise alignment with the optical axis of the second lens assembly 168.

In the aforesaid embodiment, the second adjusting jig 292 having the central beam hole 308 and the side beam holes 310 (i.e., the second adjusting jig 292 used at the time of adjusting the position of the modulating means 166) is also used in adjusting the positions of the mirror 196 of the first reflecting mirror assembly 160, the condensing lens 200 of the first lens assembly 162, and the mirror 208 of the second reflecting mirror assembly 164. In adjusting the positions of these members, the side beam holes 310 are not necessary. Accordingly, separately prepared adjusting jigs having only a central beam hole may be used in adjusting the positions of these members.

(c) Correction of production errors of lenses in the optical means

In the optical means 6 described above, it is important that the beam diameter of the scanned light beam projected should be prescribed at a predetermined value. The diameter of the scanned light beam depends upon the characteristics and positions of the condensing lens 200, the collimator lens 214 and expander lenses 216 (FIG. 7). Even when these lenses 200, 214 and 216 are precisely held at predetermined positions, the beam diameter of the scanned light beam may often deviate from a predetermined value owing to errors of the lenses 200, 214 and 216 in characteristics caused by production errors.

Figure 14:
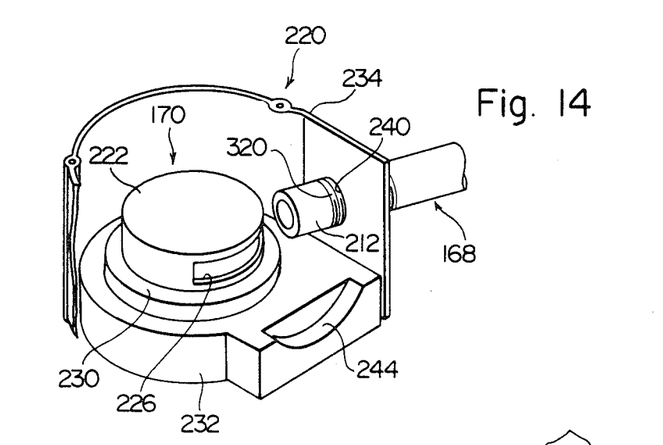
FIG. 14 is a perspective view, partly broken away, of a modified embodiment of the casing and its surrouding structure in the optical means.

In the illustrated embodiment constructed in accordance with the present invention, the lens frame 212 of the second lens assembly 168 having the collimator lens 214 and expander lenses 216 (FIG. 7) is mounted so that its position in the longitudinal direction can be freely adjusted. By adjusting the lengthwise position of the lens frame 212 (i.e., the positions of the collimator lens 214 and the expander lenses 216), the diameter of the scanned light beam can be corrected to the predetermined value. In order to perform the position adjustment of the lens frame 212 easily, it is possible, for example as shown in FIG. 14, to form an internal thread on the inner circumferential surface of the light beam incoming opening 240 formed on the side wall 234 of the casing 220 and an external thread 320 cooperating with the internal thread at one end portion of the lens frame 212, and to adjust the longitudinal position of the lens frame 212 by rotating the lens frame 212 about its central axis as a center and thus varying the degree of screwing between the internal thread and the external thread 320.

If desired, instead of, or in addition to, the adjustment of the diameter of the scanned light beam by adjusting the longitudinal position of the lens frame 212, the diameter of the scanned light beam may be adjusted by mounting the collimator lens 214 (FIG. 7) within the lens frame 212 by a suitable means so that its postion can be freely adjusted and adjusting the position of the collimator lens 214 in the longitudinal direction of the lens frame 212. Alternatively, the diameter of the scanned light beam can be adjusted by constructing the expander lenses 216 (FIG. 7) from zoom lenses known in the field of cameras and operating the zoom lenses.

(D) Air blowing in the optical means

With reference to FIGS. 4, 5 and 6, the housing of the optical means 6, i.e. the second housing 12, is divided into a first space 326 and a second space 328 by a first partitioning wall 322, the casing 220 and a second partitioning wall 324. The first partitioning wall 322 extends between the side wall 150 of the second housing 12 and the casing 220, and the second partitioning wall 324 extends between the casing 220 and the side wall 152. A plurality of vent openings 330 are formed in the first partitioning wall 322. The light beam generating means 158, the first reflecting mirror assembly 160, the first lens assembly 162, the second reflecting mirror assembly 164, the modulating means 166 and the second lens assembly 168 exist within the first space 326. The second space 328 includes the third lens assembly 172, the third reflecting mirror assembly 174, the fourth reflecting mirror assembly 176 and the fifth reflecting mirror assembly 178. The light beam passing opening 276 is also present in the second space 328.

In the illustrated embodiment, an air sucking means 334 which may be constructed of a suitable suction fan and an air discharge means 336 (FIG. 6) which can be constructed of a suitable air discharge fan are disposed in the first space 326. In relation to the air sucking means 334, an air suction opening 340 having an air filter 338 disposed therein is provided in the side wall 150. On the other hand, in relation to the air discharge means 336, an air discharge opening (not shown) is disposed in the bottom wall 146. The air sucking means 334 sucks air into the second housing 12 from outside through the air filter 338. The air discharge means 336 discharges air from the second housing 12 through the air discharge opening. The air discharged through the air discharge opening advances into the first housing 10 from an opening (not shown) formed in the upper wall 18 (FIG. 3) of the first housing 10 corresponding to the air discharge opening, and thereafter, discharged outside through an opening (not shown) formed at a suitable site of the first housing 10. By the cooperation of the air sucking means 334 with the air discharge means 336, an air current flowing near the light beam generating means 158 is set up in the first space 326 as shown by an arrow 342 in FIGS. 4 and 6, and the light beam generating means 158 is cooled by this air current.

In one embodiment of this invention, the amount of air sucked by the air suction means 334 is made larger than the amount of air discharged by the air discharge means 336. It will be easily seen that as a result, at least the vicinity of the air sucking opening 340 within the first space 326 is maintained exactly under positive pressures. On the other hand, as is clearly seen by reference to FIGS. 4 and 6, the vent openings 330 formed in the first partitioning wall 322 for air communication between the first and second spaces 326 and 328 are sufficiently away from the air discharge opening (not shown) and in proximity to the air sucking opening 340. Accordingly, as shown by the arrow 344 in FIGS. 4 and 5, air flows into the second space 328 from the first space 326 through the vent openings 330, and the second space 328 is accurately maintained under positive pressures. Thus, air is surely discharged from the second space 328 into the first housing 10 through the light beam passing opening 276 in the second space 328 and the opening 90 formed in the upper wall 18 of the first housing 10. The flowing of air from the first housing 10 back to the second space 328 through the opening 90 and the light beam passing opening 276 can be surely prevented (see FIG. 13 also). It is possible therefore to prevent surely the incoming of toner and dust and dirt from the first housing 10 to the second space 328 and the resultant adhesion of such toner and dust and dirt to the various optical elements (the f-θ lens 248, the mirrors 258, 274 and 268) present in the second space.

Figure 15:
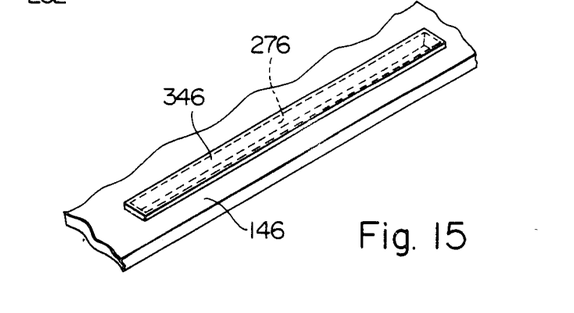
FIG. 15 is a perspective view showing a modified embodiment relating to a light beam passing opening formed in the housing of the optical means.

To prevent incoming of the toner and dust and dirt into the second space 328 (and the first space 326) from the first housing 10 through the opening 90 (FIG. 13) and the light beam passing opening 276, the light beam passing opening 276 may be closed by a substantially transparent material 346 such as a transparent glass or a transparent film as shown in FIG. 15 instead of positively passing air from the second space 328 through the light beam passing opening 276. At this time, at least that surface of the member 346 which is exposed to view has non-chargeable characteristics in order to prevent that surface of the member 346 from being charged under the influence of the charging corona discharge device 76 (see FIG. 3) of the image-forming means 4 and from gathering the toner and dust and dirt. To impart non-chargeable characteristics to the aforesaid surface of the material 346, it is possible to coat the aforesaid surface with an antistatic agent which may be a substantially transparent electroconductive paint. Alternatively, the member 346 itself may be formed of an electrically conductive glass such as NESA glass or an electrically conductive film.

Control means

The control means 8 will now be described.

(A) Outline of the construction of the control means

Figure 16:
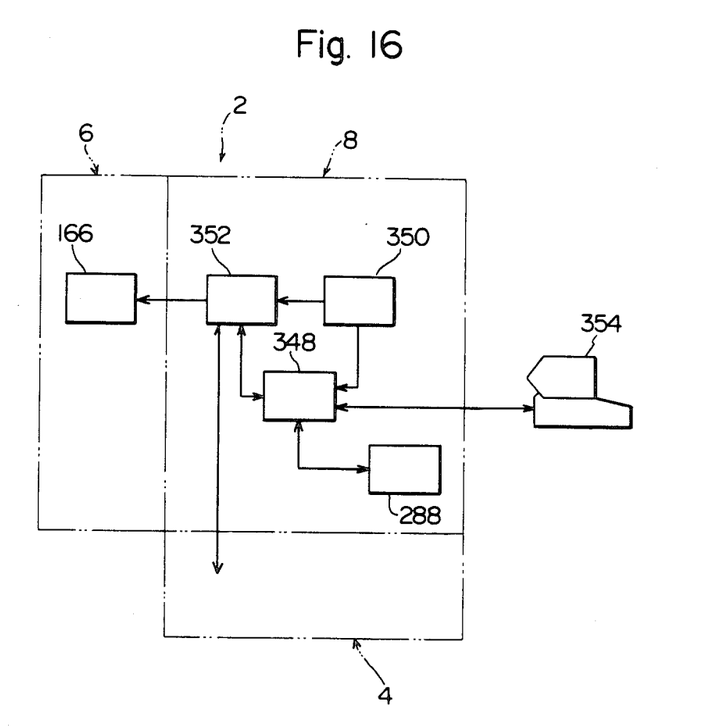
FIG. 16 is a block diagram showing a control means in the image-forming apparatus of FIG. 1.

With reference to FIG. 16, the control means 8 includes a central processing means 348, a memory means 350 and a sequence control means 352 and a panel 288 (see FIG. 1 also) disposed in the cover 20. Various operating switch means and display means are provided in the panel 288. Signals are fed from the various operating switch means provided in the panel 288 into the central processing means 348 which can be constructed of a microprocessor, and a signal is also fed into the central processing means 348 from a suitable device 354 such as a host computer to be combined with the image-forming apparatus 2. The memory means 350 is composed of a suitable memory such as a random access memory (RAM) and stores given image signals such as characters or numerical figures. The memory means 350 feeds image signals to the sequence control means 352 according to the signal fed from the central processing means 348. The sequence control means 352 feeds the image signals from the memory means 350 to the modulating means 166 of the optical means, and controls the various constituent elements of the image-forming means 4 as required correspondingly to the feeding of the image signal to the modulating means 166. When an image signal is fed from the sequence control means to the modulating means 166 of the optical means 6, the modulating means 166 modulates light beams, and therefore, a scanned light beam is projected onto the electrostatographic material 72 (FIG. 3) of the image-forming means 4. On the other hand, when no image signal is fed to the modulating means 166 from the sequence control means 352, the modulating means 166 does not modulate light beams, and no scanned light beam is projected onto the electrostatographic material 72 (FIG. 3). Thus, a required latent electrostatic image is formed as a so-called dot pattern on the electrostatographic material 72 (FIG. 3).

Figure 17:
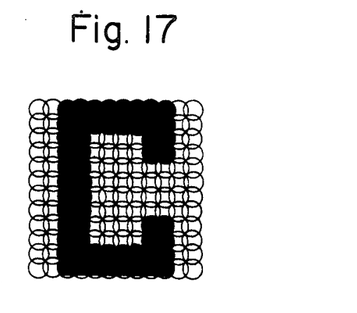
FIG. 17 is a simplified schematic view of one example of a character produced in the image-forming apparatus of FIG. 1.

FIG. 17 exemplifies letter C formed in a dot pattern. This letter C is expressed by 12×12=144 dots. In the white dots in FIG. 17, the scanned light beam has been projected onto the electrostatographic material 72, and in the black dots, no scanned light beam has been projected onto the electrostatographic material 72.

Since the above construction and operation of the control means 8 are known to those skilled in the art, a detailed description of these is omitted in the present specification.

(B) Increasing of the image forming speed

Frequently, it is desired in the image-forming device 2 to increase the speed of image formation even if this results in some reduction in the quality of the resulting image. To meet this desire, the speed of image formation is increased as shown below in one specific embodiment of the present invention.

When it is desired to increase the speed of image formation, the diameter of the scanned light beam to be projected from the optical means 6 is increased by n. The increasing of the diameter of the scanned light beam can be achieved by, for example, constructing the expander lenses 216 (FIG. 7) of the optical means 6 from zoom lenses well known in the field of cameras, and properly operating the zoom lenses. The zoom lenses can be operated automatically by attaching a suitable operating means and feeding an operating signal to the operating means from the central processing means 348. In addition to increasing the diameter of the scanned light beam by n, the speed of feeding the image signals to the modulating means 166 of the optical means 6 from the memory means 350 through the sequence control means 352 is decreased by 7/n, and the moving speed of the electrostatographic material 72 in the image-forming means 4, and therefore the rotating speed of the rotating drum 70 (FIG. 3), are increased by n (in which case the conveying speed of the copying paper is naturally increased by n). It is easily appreciated that as a result, the number of image signals fed per predetermined area of the electrostatographic material 72 (FIG. 3) is decreased to by 7/2n. By this procedure, the image forming speed can be increased by n.

Figure 18:
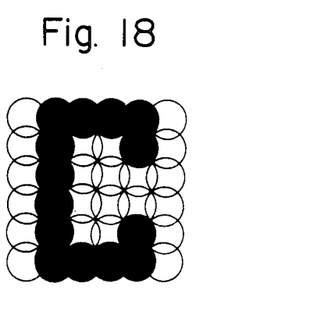
FIG. 18 is a simplified schematic view of one example of a character produced in the image-forming apparatus of FIG. 1 when the speed of image formation is doubled.

FIG. 18 exemplifies letter C formed in a dot pattern when the image forming speed has been doubled, namely when the diameter of the scanned light beam projected from the optical means 6 is doubled, the speed of feeding image signals to the modulating means through the sequence control means 352 from the memory means 350 is decreased to ½, and the moving speed of the electrostatographic material 72 in the image-forming means 4 is doubled.

It will be easily seen by comparing FIGS. 17 and 18 that when the image-forming speed is doubled, the letter C as shown in FIG. 18 is expressed by 6×6=36 dots which is ¼ of the number of dots in FIG. 17 (12×12=144). Since the display of the letter C is the same for both, the letter C in FIG. 18 has an inferior image quality to that in FIG. 17 because of the decrease of the number of dots.

While the present invention has been described in detail hereinabove with regard to specific embodiments of the image-forming apparatus constructed in accordance with this invention with referece to the accompanying drawings, it is to be understood that the invention is not limited to these specific embodiments, and various changes and modifications are possible without departing from the scope of the invention.

What is claimed is:

1. An image-forming apparatus comprising optical means for projecting a scanned light beam to be controlled according to an image to be formed, electrostatic image-forming means for forming an image corresponding to the scanned light beam including an electrostatographic material and means for moving the electrostatographic material through an exposure zone for irradiation with the scanned light beam from the optical means, and control means for controlling the optical means and the image-forming means, said control means being adapted to control the optical means by feeding to the optical means image signals for controlling the scanned light beam according to the image to be formed and to control the image-forming means by controlling the moving means to control movement of the electrostatographic material; wherein the optical means includes first changing means for changing the diameter of the scanned light beam, and the control means includes second changing means for changing the speed of feeding of the image signal to the optical means according to the change in the diameter of the scanned light beam and third changing means for changing the moving speed of the electrostatographic material in the image-forming means according to the change in the diameter of the scanned light beam.

2. The apparatus of claim 1 wherein when the diameter of the scanned light beam is increased by n, the second changing means decreases the speed of feeding the image signal to the optical means by 1/n and the third changing means increases the moving speed of the electrostatographic material in the image-forming means by n.

3. The apparatus of claim 1 wherein the optical means includes light beam generating means, scanning means for scanning a light beam received from the light beam generating means, and a zoom lens disposed between the light beam generating means and the scanning means, and wherein the means for changing the beam diameter operates the zoom lens.

4. The apparatus of claim 3, wherein the optical means includes modulating means disposed between the light beam generating means and the zoom lens for modulating the light beam from the light beam generating means; the image signals from the control means are fed into the modulating means; and the modulating means modulates the light beam according to the image signals.

* * * * *